US007995063B2

(12) United States Patent
Nakamura (10) Patent No.: US 7,995,063 B2
(45) Date of Patent: Aug. 9, 2011

(54) FIGURE RENDERING APPARATUS AND FIGURE RENDERING METHOD

(75) Inventor: Huminobu Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 508 days.

(21) Appl. No.: 12/209,357

(22) Filed: Sep. 12, 2008

(65) Prior Publication Data

US 2009/0073173 A1 Mar. 19, 2009

(30) Foreign Application Priority Data

Sep. 14, 2007 (JP) ................................ 2007-238912

(51) Int. Cl.
*G06T 11/20* (2006.01)
(52) U.S. Cl. ...................................................... 345/441
(58) Field of Classification Search .......... 345/441–443; 708/146
See application file for complete search history.

(56) References Cited

U.S. PATENT DOCUMENTS

| 5,548,695 A | 8/1996 | Asano et al. | |
|---|---|---|---|
| 6,891,541 B1 * | 5/2005 | Harris | 345/443 |
| 2002/0075227 A1 * | 6/2002 | Miller et al. | 345/156 |

FOREIGN PATENT DOCUMENTS

| JP | 5-334383 A | 12/1993 |
|---|---|---|
| JP | 08-339453 A | 12/1996 |
| JP | 9-282475 A | 10/1997 |
| JP | 11-161803 A | 6/1999 |
| JP | 2001-100902 A | 4/2001 |
| JP | 2005-70880 A * | 3/2005 |

OTHER PUBLICATIONS

Casio ClassPad 330 ClassPad OS Version 3.04 User's Guide, 2006, http://support.casio.com/pdf/004/CP330ver304_E.pdf, pp. 8-5-4 and 8-5-7.*
Casio fx-9860G SD, fx-9860G User's Guide, 2005, http://support.casio.com/pdf/004/fx9860GSD_9860G_E.pdf, pp. 5-8-1 to 5-8-8.*
Casio fx-9860G Series Software Version 1.10 User's Guide, 2007, http://support.casio.com/pdf/004/fx9860G_Slim_Soft_Eng.pdf, pp. 5-8-1 to 5-8-8.*
Japanese Office Action dated Sep. 15, 2009 and English translation thereof issued in a counterpart Japanese Application No. 2007-238912.
J. Richter-Gebert et al "Shinderera Kikagaku No Tame No Gurafikkusu (Cinderella: Graphics for Geometry)", Japan, Springer-Verlag Tokyo KK, Nov. 26, 2003, pp. 67, 85, 101-103 and 126. Japanese language and Partial English Translation of article provided.

* cited by examiner

*Primary Examiner* — Jeffery A Brier
(74) *Attorney, Agent, or Firm* — Holtz, Holtz, Goodman & Chick, PC (57) ABSTRACT

Disclosed is a figure rendering apparatus including: a figure displaying section to display a figure by rendering the figure in a display screen; a setting section to set an arbitrary point on a rendering figure as a moving point, a moving range of the moving point, and an arbitrary point on the rendering figure as a locus point on a basis of a user's operation; and a control section to render a locus of the locus point in the display screen when the moving point moves in the moving range; to obtain a plurality of pieces of position information of the locus point in the locus; and to judge whether the plurality of pieces of position information obtained by the control section fits predetermined functional formulae or not, and to display information of a functional formula judged to be fit by the pieces of position information in the display screen.

12 Claims, 8 Drawing Sheets

| KINDS OF LOCI | FUNCTIONAL FORMULAE |
|---|---|
| STRAIGHT LINE | $y=ax+b, x=a$ |
| CIRCLE | $(x-a)^2+(y-b)^2=R^2$ |
| CONIC CURVE | $ax^2+bxy+cy^2+dx+ey+f=0$ |

FIGURE RENDERING APPARATUS AND FIGURE RENDERING METHOD

BACKGROUND OF THE INVENTION

1. Field of the Invention

The present invention relates to a figure rendering apparatus and a figure rendering method.

2. Description of Related Art

In classes of geometry in a junior high school, a senior high school, and the like, a problem of obtaining a locus of a specific point with the movement of a point or a line in a figure when the point or the line moves in a certain range is set as a problem.

Accordingly, a recent figure rendering apparatus is adapted to render the locus of a specific point while moving a part of a rendered figure in conformity with a certain condition from the point of view of aiding the understanding of such a problem (see, for example, Japanese Patent Application Laid-Open Publication No. Hei 8-339453).

However, although the figure rendering apparatus disclosed in Japanese Patent Application Laid-Open Publication No. Hei 8-339453 enables the visual confirmation of the state of the locus to be rendered, the figure of the locus can be known only by a conjecture from a general view, and it is also impossible to judge the true or false of the conjecture.

It is an object of the present invention to provide a figure rendering apparatus and figure rendering method both capable of allowing a user to recognize the content of the locus to be rendered.

SUMMARY OF THE INVENTION

A first aspect of the present invention is a figure rendering apparatus including: a figure displaying section to display a figure by rendering the figure in a display screen; a moving point setting section to set an arbitrary point on a rendering figure as a moving point on a basis of a user's operation; a moving point moving range setting section to set a moving range of the moving point on a basis of a user's operation; a locus point setting section to set an arbitrary point on the rendering figure as a locus point on a basis of a user's operation; a locus rendering control section to render a locus of the locus point in the display screen when the moving point moves in the moving range; a locus position information obtaining section to obtain a plurality of pieces of position information of the locus point in the locus; and a locus information display control section to judge whether the plurality of pieces of position information obtained by the locus position information obtaining section fits predetermined functional formulae or not, and to display information of the functional formula judged to be fit by the pieces of position information in the display screen.

According to the present invention, the locus of a locus point when a moving point moves in a moving range is rendered in a display screen, and a plurality of pieces of position information of the locus point in the locus is obtained to be judged whether the plurality of pieces of position information fits predetermined functional formulae or not. Then, the information of the functional formula judged to be fit by the plurality of pieces of position information is displayed in a display screen. Consequently, it is possible to allow a user to recognize the content of the locus with the information of the functional formula.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, a figure rendering apparatus according to the present invention will be described with reference to the attached drawings.

[1.1 External Appearance Configuration]

Figure 1:
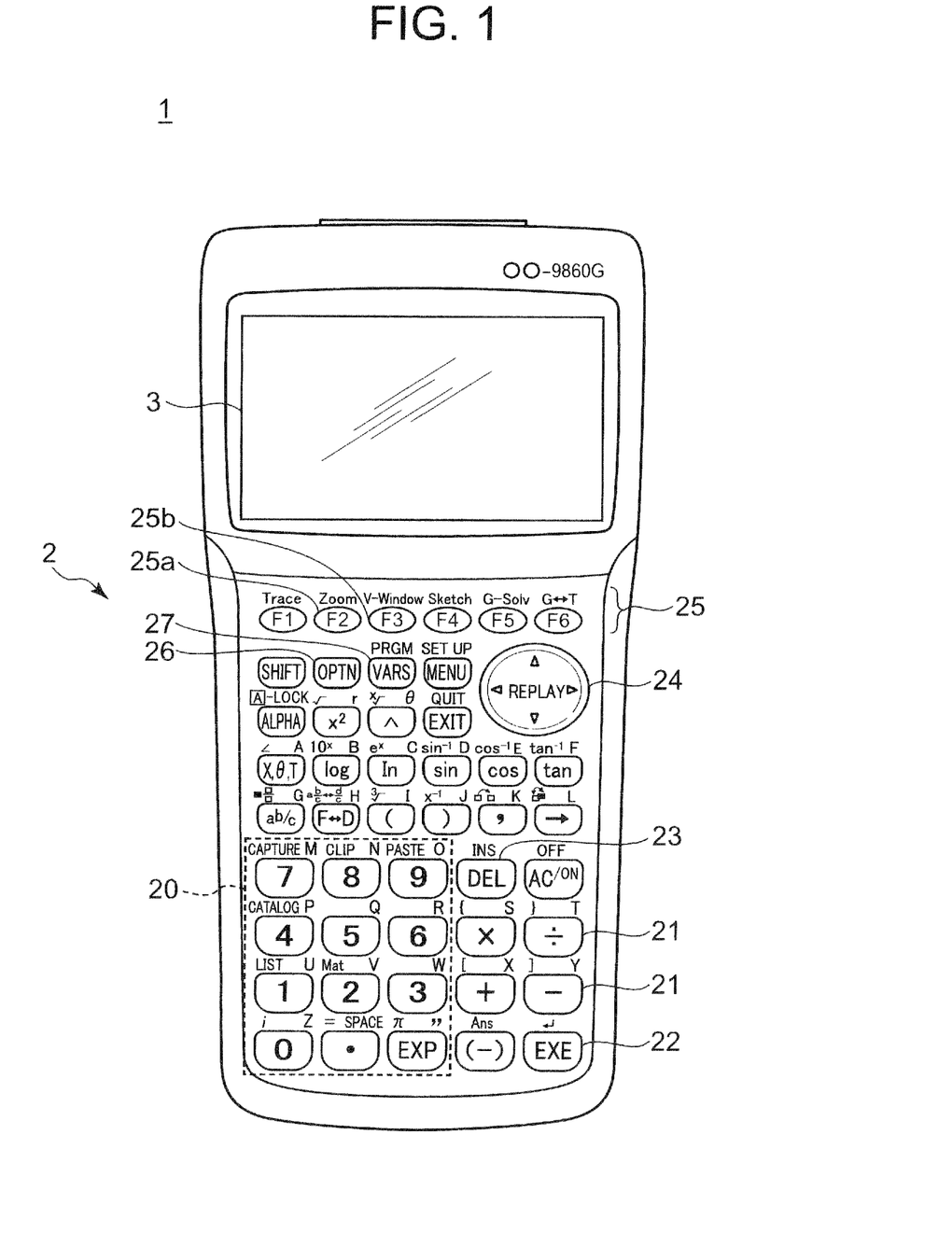
FIG. 1 is an external view showing a scientific calculator to which a figure rendering apparatus according to the present invention is applied.

FIG. 1 is a front view of a scientific calculator 1 to which a figure rendering apparatus according to the present invention is applied.

As shown in this figure, the scientific calculator 1 is equipped with a various key group 2 and a display 3.

The various key group 2 is a key group for receiving user's input operations of a numerical value, an operation symbol, and the like, and for receiving instruction operations of various kinds of processing. The various key group 2 is provided with a plurality of keys, each of which a peculiar function is assigned. In the present embodiment, the various key group 2 is composed of numeric keys 20, operation symbol keys 21, an EXE key 22, a DEL key 23, a direction key 24, function keys 25, an OPTN key 26, a VARS key 27, and the like.

Among them, the numeric keys 20 are keys for receiving the input operations of numerical values, and the operation symbol keys 21 are keys for receiving the input operations of various operation symbols.

The EXE key 22 functions as a key for instructing the execution of various kinds of processing, such as operation processing and figure rendering processing. The DEL key 23 is a key for receiving a deleting operation of a numerical value, an operation symbol, and the like, displayed on the display 3.

The direction key 24 is a key to be depressed in the case of moving a cursor CR (see FIG. 7A and the like) displayed in the display 3 into a predetermined moving direction, and is configured to be able to receive inputs into four directions of the left, right, top, and bottom directions in the present embodiment.

The function keys 25 are keys for instructing the execution of previously assigned predetermined processing. To put it more concretely, the function keys 25 in the present embodiment includes a F2 key 25a for displaying a selection window of an operation of a rendered figure element in the figure rendering processing, which will be described later (see FIGS. 4-6), a F3 key 25b for displaying a selection window of a figure element to be rendered, and the like. Here, "3 (Deselect All)" (indicating the release of all selections with the cursor CR) and the like are displayed as choices in the selection window displayed when the F2 key 25a is operated. Moreover, the figure elements are composed of points, straight lines, and curved lines in the present embodiment.

Moreover, the OPTN key 26 is depressed at the time of displaying the selection window of an operation as to locus rendering in the figure rendering processing (see FIGS. 4-6), which will be described later. Here, "7 (Locus)" (indicating the setting of a locus point), "8 (Analyze Locus)" (indicating locus analysis), and the like, are displayed as choices in the selection window displayed when the OPTN key 26 is operated.

Moreover, the VARS key 27 is depressed at the time of fixing a point or a line in a rendering figure to be immovable in the figure rendering processing (see FIGS. 4-6), which will be described later.

The display 3 is a part on which various data necessary for using the scientific calculator 1 is displayed besides characters, marks, numerical formulae, operation results, figures, and the like, according to the depressions of various key group 2. Incidentally, the display 3 in the present embodiment will be described as a display configured of dot matrix liquid crystal, but it is needles to say that the display 3 may be other type display apparatus, such as a thin film transistor (TFT) liquid crystal display and a plasma display panel (PDP).

[1.2 Functional Configuration]

Successively, the functional configuration of the scientific calculator 1 is described.

Figure 2:
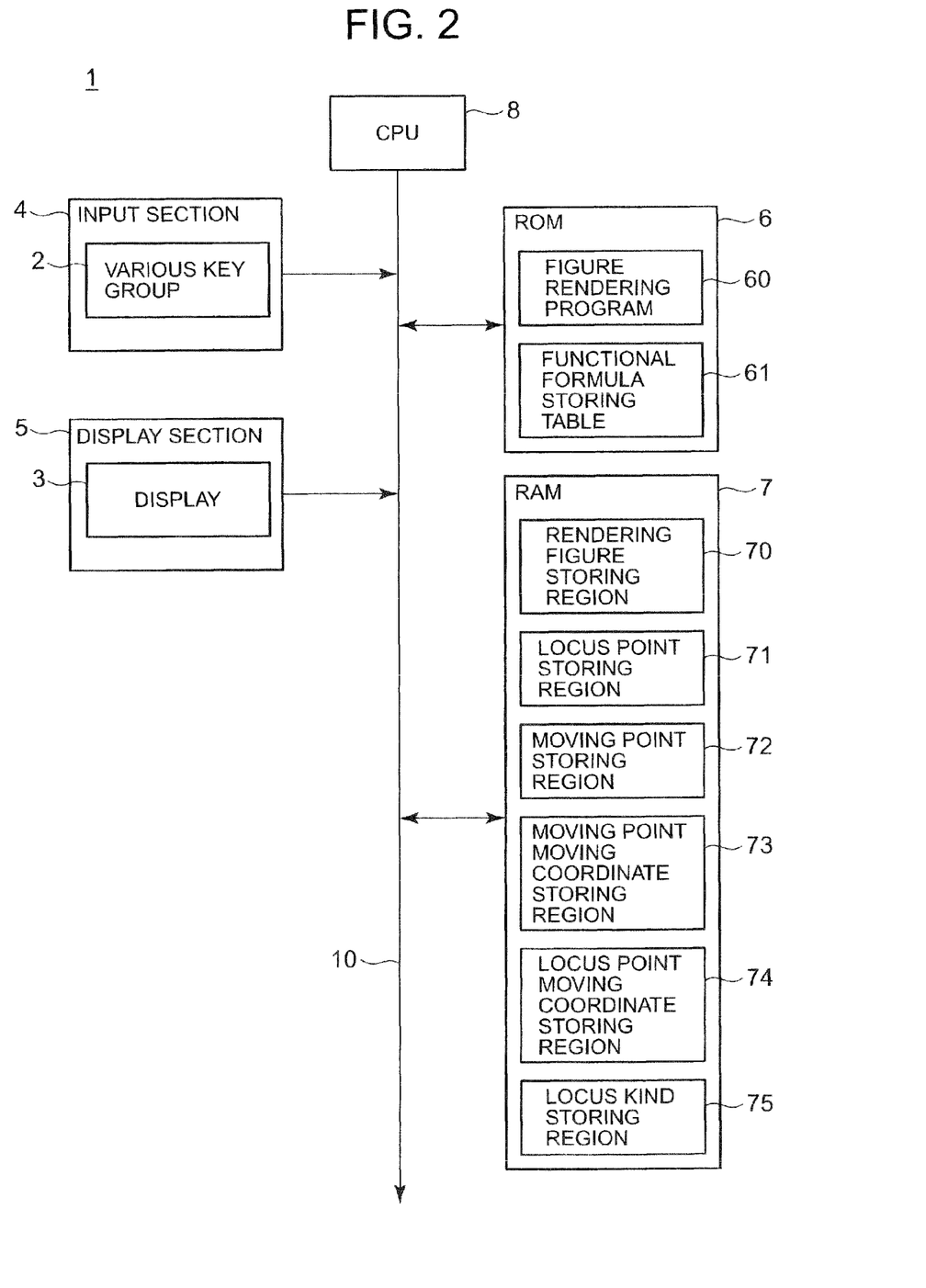
FIG. 2 is a block diagram showing the scientific calculator to which the figure rendering apparatus according to the present invention is applied.

FIG. 2 is a block diagram showing the functional configuration of the scientific calculator 1. As shown in this figure, the scientific calculator 1 is equipped with function sections such as an input section 4, a display section 5, a read only memory (ROM) 6, a random access memory (RAM) 7, and a central processing unit (CPU) 8, and each function section is connected through a bus 10.

The input section 4 is equipped with the various key group 2, and outputs a signal of a depressed key to the CPU 8.

The display section 5 is equipped with the aforesaid display 3, and displays various kinds of information on the display 3 on the basis of a signal from the CPU 8.

The ROM 6 stores the programs pertaining to the operations of the scientific calculator 1, such as menu displaying processing, various kinds of setting processing, and various kinds of operation processing, the programs for realizing various functions of the scientific calculator 1, and the like. In the present embodiment, the ROM 6 stores a figure rendering program 60 and a functional formula storing table 61, both of which are related to the present invention.

The figure rendering program 60 is a program for enabling the CPU 8 to execute the figure rendering processing, which will be described later (see FIGS. 4-6).

Figure 3:
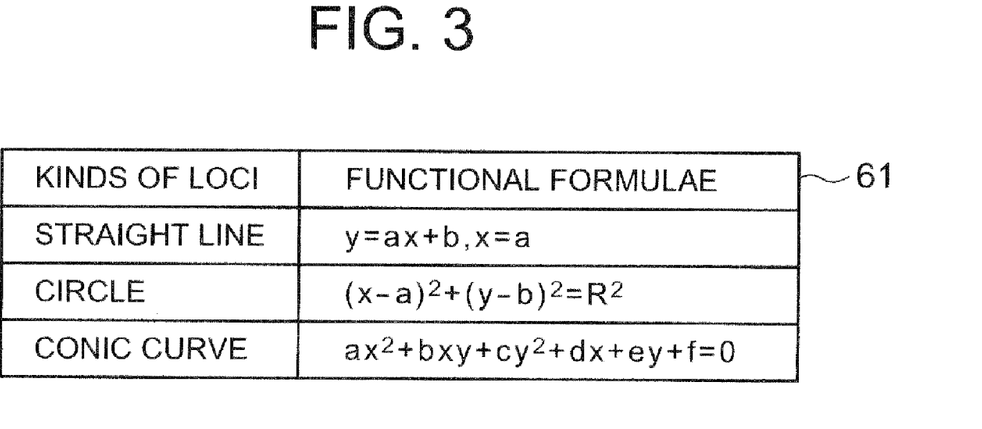
FIG. 3 is a diagram showing a functional formula storing table.

The functional formula storing table 61 stores the kinds of loci that can be rendered in the figure rendering processing, which will be described later (see FIGS. 4-6), and the functional formulae indicating the loci in a state in which the kinds of loci and the functional formulae are associated with each other as shown in FIG. 3. Here, in the present embodiment, a straight line, a circle, and a conic curve other than the circle are used as the kinds of loci. Incidentally, the conic curve other than the circle indicates an ellipse, a parabola, or a hyperbolic curve. Moreover, "x" and "y" denote variables, and "a," "b," . . . , "f," and "R" denote arbitrary constants in each functional formula.

The RAM 7 is a memory writable at any time for temporarily holding the various programs to be executed by the CPU 8, the data pertaining to the execution of these programs, and the like. In the present embodiment, the RAM 7 includes a rendering figure storing region 70, a locus point storing region 71, a moving point storing region 72, a moving point moving coordinate storing region 73, a locus point moving coordinate storing region 74, and a locus kind storing region 75.

Among them, the content of a figure rendered in the figure rendering processing, which will be described later (see FIGS. 4-6), (hereinafter referred to as rendering figure) is stored in the rendering figure storing region 70.

Moreover, the position and the coordinates in a rendering figure of a point set as a locus point in the figure rendering processing, which will be described later (see FIGS. 4-6), are stored in the locus point storing region 71.

Moreover, the position and the coordinates in a rendering figure of a point set as a moving point in the figure rendering processing, which will be described later (see FIGS. 4-6), are stored in the moving point storing region 72.

Moreover, the coordinates at each division point of the division of the moving path of a moving point in the figure rendering processing, which will be described later (see FIGS. 4-6), are stored in the moving point moving coordinate storing region 73.

Moreover, the coordinates of a locus point in the case where a moving point is situated at each coordinate in the moving point moving coordinate storing region 73 in the figure rendering processing, which will be described later (see FIGS. 4-6), are stored in the locus point moving coordinate storing region 74.

Moreover, the kind of a locus rendered by the movement of a locus point is stored in the locus kind storing region 75. Incidentally, in the present embodiment, the kind of a locus is any of "immovable point," "straight line," "circle," "conic curve," and "indeterminate point." Here, the "indeterminate point" means that a locus is not any of the immovable point, the straight line, the circle, and the conic curve.

The CPU 8 executes the processing based on a predetermined program according to an input instruction, and transfers an instruction to each function section and data. To put it concretely, the CPU 8 reads a program in the ROM 6 according to an operation signal input from the input section 4, and develops the read program into the RAM 7 to execute the processing in conformity with the program. Then, the CPU 8 suitably outputs a display control signal for displaying a processing result to the display section 5 to make the display section display the corresponding information.

[1.3 Operation of Scientific Calculator]

Successively, the operation of the scientific calculator 1 is described. FIGS. 4-6 are flowcharts for describing the operation of the figure rendering processing in which the CPU 8 reads the figure rendering program 60 from the ROM 6 to execute it.

Figure 4:
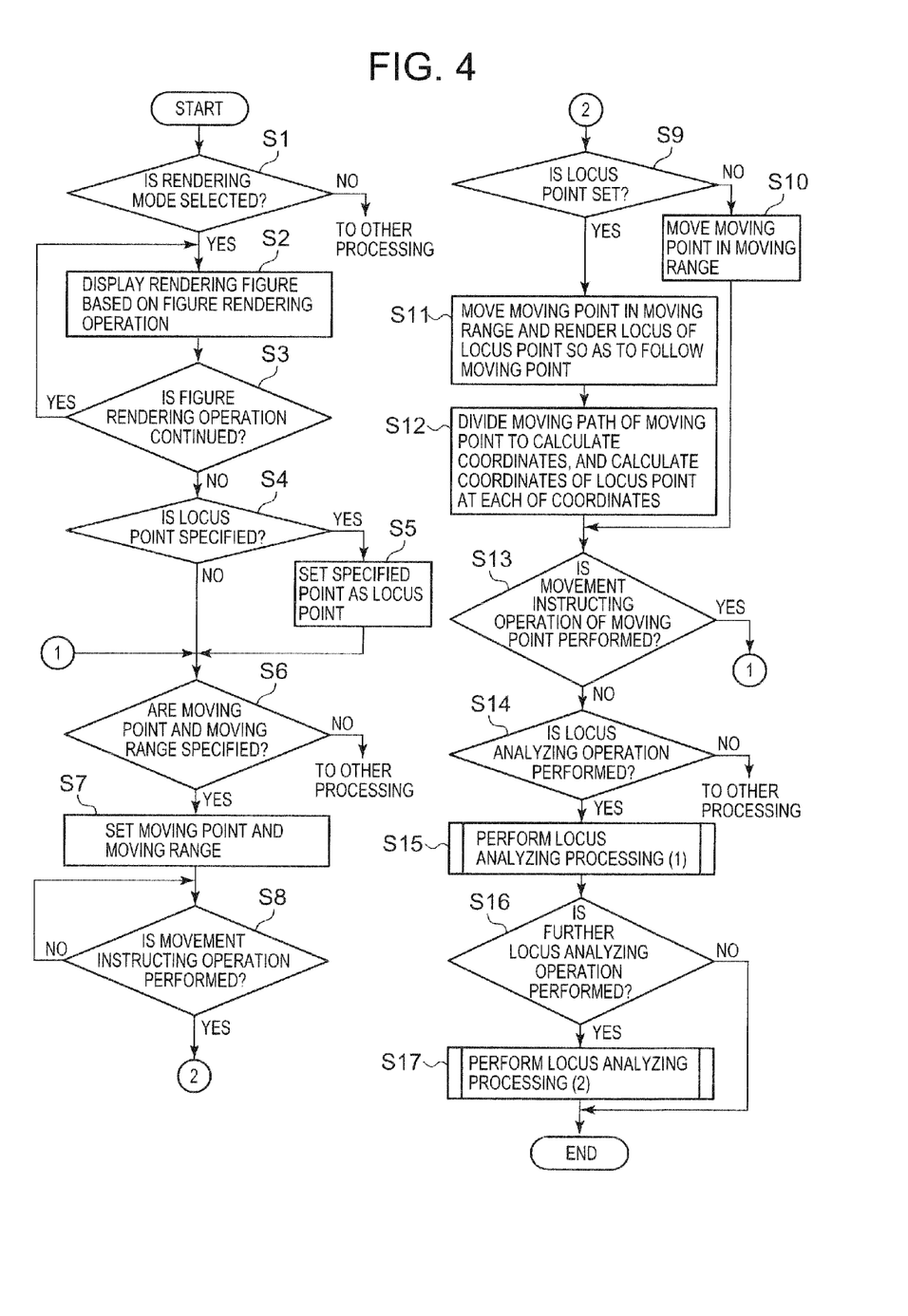
FIG. 4 is a flowchart showing figure rendering processing.

First, as shown in FIG. 4, the CPU 8 judges whether the figure rendering mode is selected or not by a user with the various key group 2 (Step S1). If the CPU 8 judges that the selection is not performed (Step S1; No), then the CPU 8 moves the processing to other processing.

Moreover, if the CPU 8 judges that the figure rendering mode is selected at Step S1 (Step S1; Yes), then the CPU 8 allows a user to perform the figure rendering operation with the various key group 2. The CPU 8 renders a figure on the display 3 according to the operation, and makes the rendering figure storing region 70 store the rendered figure (Step S2). Incidentally, when the user specifies a point or a line in the rendering figure by operating the VARS key 27, the CPU 8 fixes the point or the line to set it as immovable.

Next, the CPU 8 judges whether the figure rendering operation is continuously performed by the user or not (Step S3), and if CPU 8 judges that the figure rendering operation is performed (Step S3; Yes), then the CPU moves the processing to that at Step S2.

Moreover, if the CPU 8 judges that no figure rendering operation is performed at Step S3 (Step S3; No), then the CPU 8 judges whether a point of a locus rendering object is specified in the rendering figure or not (Step S4). If the CPU 8 judges that no point is specified (Step S4; No), the CPU 8 moves the processing to that at Step S6, which processing will be described later.

Moreover, if the CPU 8 judges that a point of the locus rendering object is specified at Step S4 (Step S4; Yes), the CPU 8 sets the specified point as a locus point, and stores the position and the coordinates of the locus point in the rendering figure into the locus point storing region 71 (Step S5).

Next, the CPU 8 judges whether a point of a moving object and the moving range thereof are specified in the rendering figure or not (Step S6). If the CPU 8 judges that no point and no moving range are specified (Step S6; No), the CPU moves the processing to other processing.

Moreover, if the CPU 8 judges that a point and a moving range are specified at Step S6 (Step S6; Yes), the CPU 8 sets the specified point as a moving point, and stores the position and the coordinates of the moving point in the rendering figure together with the moving range into the moving point storing region 72 (Step S7).

Next, the CPU 8 judges whether a user performs a movement instructing operation of a moving point with the various key group 2 or not (Step S8). If the CPU 8 judges that the movement instructing operation is not performed (Step S8; No), the CPU returns the processing to that at Step S8.

Moreover, if the CPU 8 judges that the movement instructing operation is performed at Step S8 (Step S8; Yes), then the CPU 8 judges whether a locus point is set or not (Step S9). If the CPU 8 judges that no locus point is set (Step S9; No), then the CPU 8 moves the moving point in the moving range on the basis of the information in the moving point storing region 72 (Step S10), following which the CPU 8 moves the processing to that at Step S13, which will be described later.

Moreover, if the CPU 8 judges that the locus point is set at Step S9 (Step S9; Yes), then the CPU 8 moves the moving point in the moving range on the basis of the information in the moving point storing region 72, and makes the locus point render a locus to follow the movement of the moving point (Step S11). Moreover, the CPU 8 does not move the point and line that are set as being immovable to be in a fixed state in this case. Incidentally, at Step S11, the identification display between the point and the line that are moved to be rendered and the point and the line that are fixed to be rendered may be performed by means of the thickness of lines, or the like. In this case, user's identification of the moving point and the locus point can be made to be easier.

Next, the CPU 8 calculates the coordinates of each division point created by dividing the moving path of the moving point, and stores the coordinates into the moving point moving coordinate storing region 73. The CPU 8 further calculates the coordinates of the locus point when the moving point is situated at each of these division points to store the calculated coordinates into the locus point moving coordinate storing region 74 (Step S12).

Next, the CPU 8 judges whether the movement instructing operation of the moving point is continuously performed by the user or not (Step S13). If the CPU 8 judges that the movement instructing operation is performed (Step S13; Yes), then the CPU 8 moves the processing to that at Step S6.

Moreover, if the CPU 8 judges that no movement instructing operation of the moving point is performed at Step S13 (Step S13; No), then the CPU 8 judges whether the user performs a locus analyzing operation with the various key group 2 or not (Step S14). If the CPU 8 judges that no locus analyzing operation is performed (Step S14; No), the CPU 8 moves the processing to other processing.

Moreover, if the CPU 8 judges that the locus analyzing operation is performed at Step S14 (Step S14; Yes), then the CPU 8 performs locus analyzing processing (1) (Step S15).

Figure 5:
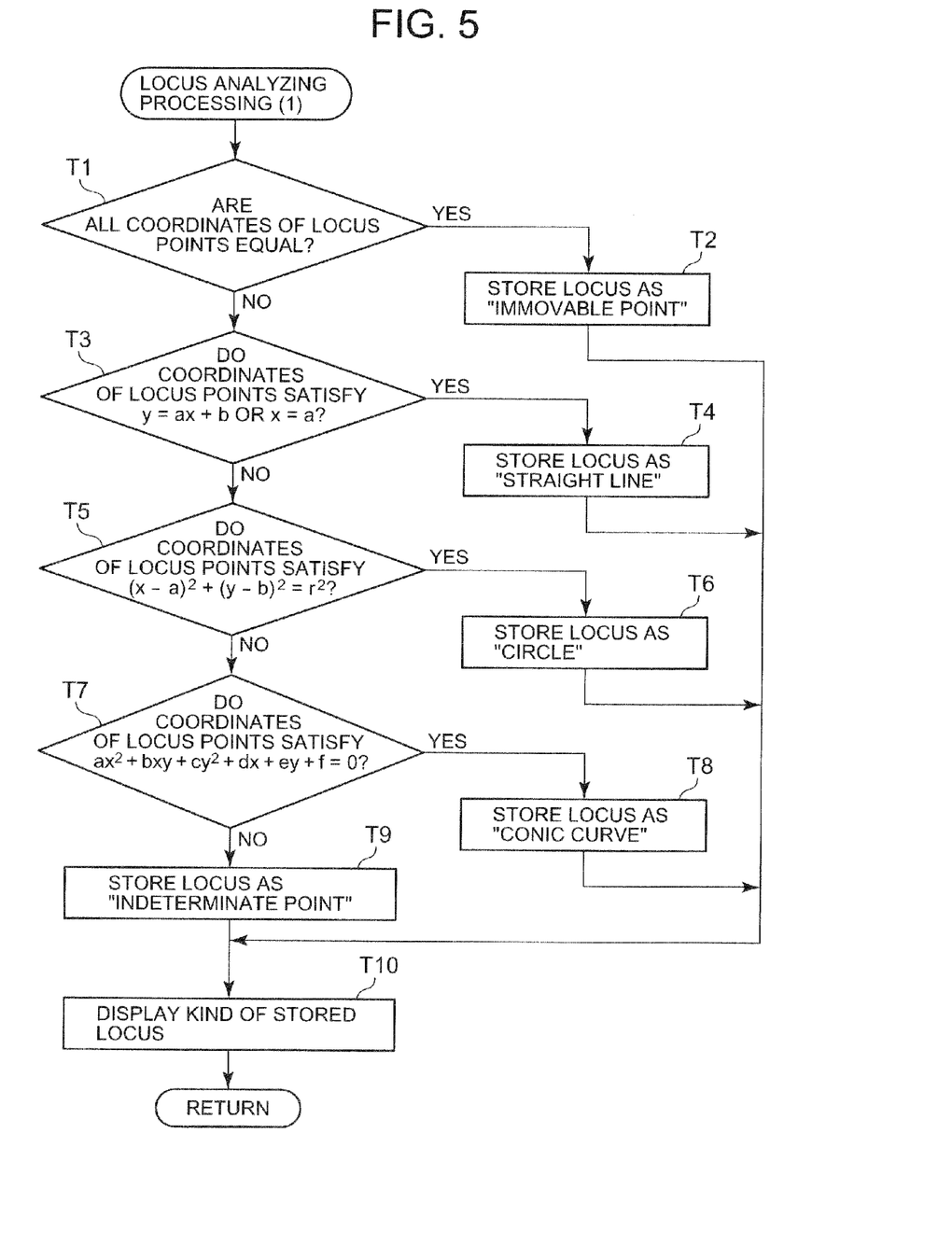
FIG. 5 is another flowchart showing the figure rendering processing.

To put it concretely, as shown in FIG. 5, first, the CPU 8 judges whether all of the coordinates of a locus point stored in the locus point moving coordinate storing region 74 are equal or not (Step T1). If the CPU 8 judges that all of the coordinates are equal (Step T1; Yes), the CPU 8 stores the kind of the locus into the locus kind storing region 75 as "immovable point" (Step T2), and moves the processing to that at Step T10, which will be described later.

Moreover, if the CPU 8 judges that not all of the coordinates are equal at Step T1 (Step T1; No), then the CPU 8 judges whether the coordinates satisfy the functional formula of a straight line, that is, $y=ax+b$ or $x=a$, or not on the basis of the information in the functional formula storing table 61 (Step T3). If the CPU 8 judges that the coordinates satisfy the functional formula (Step T3; Yes), then the CPU 8 stores the kind of the locus into the locus kind storing region 75 as "straight line" (Step T4), and moves the processing to that at Step T10, which will be described later.

Moreover, if the CPU 8 judges that the coordinates do not satisfy the function formula of a straight line at Step T3 (Step T3; No), then the CPU 8 judges whether the coordinates of the locus point satisfy the functional formula of a circle, that is, $(x-a)^2+(y-b)^2=R^2$, or not (Step T5). If the CPU 8 judges that the coordinates satisfy the functional formula (Step T5; Yes), then the CPU 8 stores the kind of the locus into the locus kind storing region 75 as "circle" (Step T6), and moves the processing to that at Step T10, which will be describes later.

Moreover, if the CPU 8 judges that the coordinates do not satisfy the functional formula of the circle at Step T5 (Step T5; No), then the CPU 8 judges whether the coordinates of the locus point satisfy the functional formula of a conic curve, that is, $ax^2+bxy+cy^2+dx+ey+f=0$, or not (Step T7). If the CPU 8 judges that the coordinates satisfy the functional formula (Step T7; Yes), then CPU 8 stores the kind of the locus into the locus kind storing region 75 as "conic curve" (Step T8), and moves the processing to that at Step T10, which will be described later.

Moreover, if the CPU 8 judges that the coordinates do not satisfy the functional formula of the conic curve at Step T7 (Step T7; No), then the CPU 8 stores the kind of locus into the locus kind storing region 75 as "indeterminate point," following which the CPU 8 makes the display 3 display the kind of locus stored in the locus kind storing region 75 (Step T10) to end the locus analyzing processing (1).

Next, the CPU 8 judges whether the user performs further locus analyzing operation with the various key group 2 or not (Step S16), as shown in FIG. 4. If the CPU 8 judges that the user does not perform the further locus analyzing operation (Step S16; No), then the CPU 8 ends the figure rendering processing.

Moreover, if the CPU 8 judges that the user performs the further locus analyzing operation at Step S16 (Step S16; Yes), then the CPU 8 performs locus analyzing processing (2) (Step S17).

Figure 6:
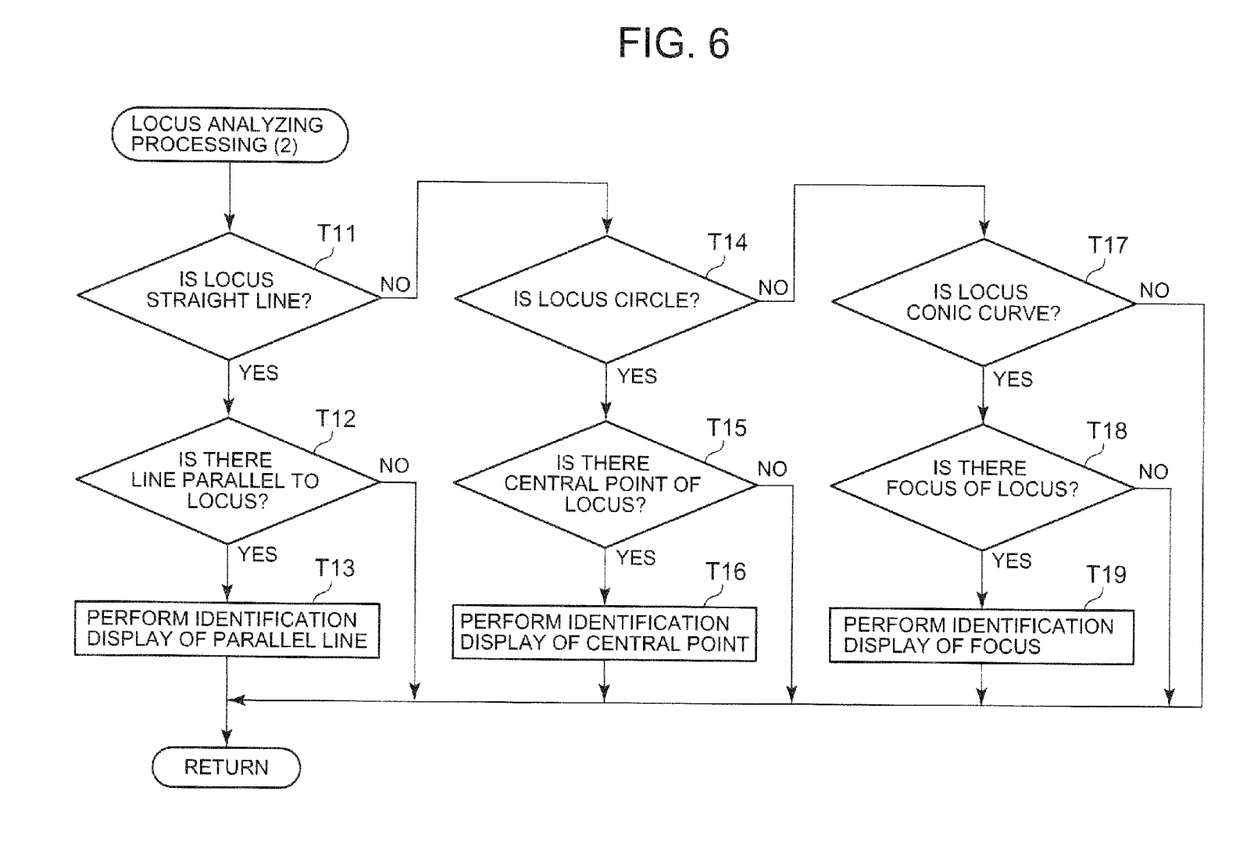
FIG. 6 is a further flowchart showing the figure rendering processing.

To put it concretely, as shown in FIG. 6, first, the CPU 8 judges whether the locus of the locus point is a straight line or not on the basis of the information in the locus kind storing region 75 (Step T11). If the CPU 8 judges that the locus is the straight line (Step T11; Yes), then the CPU 8 judges whether there is a parallel straight line to the straight line of the locus in the rendering figure or not (Step T12).

If the CPU 8 judges that no parallel straight line exists at Step T12 (Step T12; No), the CPU 8 ends the locus analyzing processing (2), following which the CPU 8 ends the figure rendering processing as shown in FIG. 4.

Moreover, as shown in FIG. 6, if the CPU 8 judges that the parallel straight line exists at Step T12 (Step T12; Yes), then the CPU 8 performs the identification display of the parallel straight line on the display 3 (Step T13), and ends the locus analyzing processing (2), following which the CPU 8 ends the figure rendering processing. Incidentally, as the mode of the identification display, the line may be made to be thicker, or may be turned on and off.

Moreover, if the CPU 8 judges that the locus is not the straight line at Step T11 (Step T11; No), then the CPU 8 judges whether the locus of the locus point is a circle or not on the basis of the information in the locus kind storing region 75 (Step T14). If the CPU 8 judges that the locus is the circle (Step T14; Yes), then the CPU 8 judges whether the central point of the circle of the locus exists in the rendering figure or not (Step T15).

If the CPU 8 judges that the central point does not exist at Step T15 (Step T15; No), then the CPU 8 ends the locus analyzing processing (2), following which the CPU 8 ends the figure rendering processing.

Moreover, if the CPU 8 judges that the central point exists at Step T15 (Step T15; Yes), the CPU 8 performs the identification display of the central point on the display 3 (Step T16), and ends the locus analyzing processing (2), following which the CPU 8 ends the figure rendering processing.

Moreover, if the CPU 8 judges that the locus is not the circle at Step T14 (Step T14; No), then the CPU 8 judges whether the locus of the locus point is a conic curve or not on the basis of the information in the locus kind storing region 75 (Step T17). If the CPU 8 judges that the locus is not the conic curve (Step T17; No), then the CPU 8 ends the locus analyzing processing (2), following which the CPU 8 ends the figure rendering processing.

Moreover, if the CPU 8 judges that the locus is the conic curve at Step T17 (Step T17; Yes), then the CPU 8 judges whether a focus of the conic curve of the locus exists in the rendering figure or not (Step T18).

If the CPU 8 judges that no focus exists at Step T18 (Step T18; No), then the CPU 8 ends the locus analyzing processing (2), following which the CPU 8 ends the figure rendering processing.

Moreover, if the CPU 8 judges that the focus exists at Step T18 (Step T18; Yes), then the CPU 8 performs the identification display of the focus on the display 3 (Step T19), and ends the locus analyzing processing (2), following which the CPU 8 ends the figure rendering processing.

[1.4 Operation Example]

Successively, the figure rendering processing mentioned above is concretely described. Incidentally, the contents of a user's key operations are shown on the left sides of FIGS. 7A-8B in the figures.

Figure 7A:
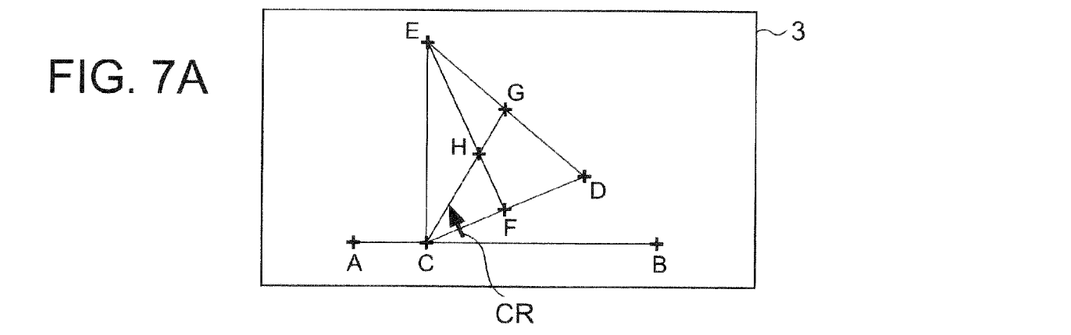
FIGS. 7A, 7B, 7C, and 7D are diagrams showing display contents in the figure rendering processing.

First, for example, as shown in FIG. 7A, after a user has operated the various key group 2 to select the figure rendering mode (Step S1; Yes), the user renders a triangle CDE and straight lines AB, CG, and EF. Then, the rendering figures are displayed on the display 3 (Step S2). Here, the vertex C of the triangle CDE is situated on the straight line AB. Moreover, points F and G are the middle points of the line segments CD and DE, respectively, and the intersection point H of the straight lines CG and EF is the center of gravity of the triangle CDE.

Next, the user operates the direction key 24 to move the cursor CR onto the respective points A, B, D, and E, and then operates the EXE key 22 and the VARS key 27 in that order. Then, these points A, B, D, and E are set as immovable points in the rendering figure.

Figure 7B:
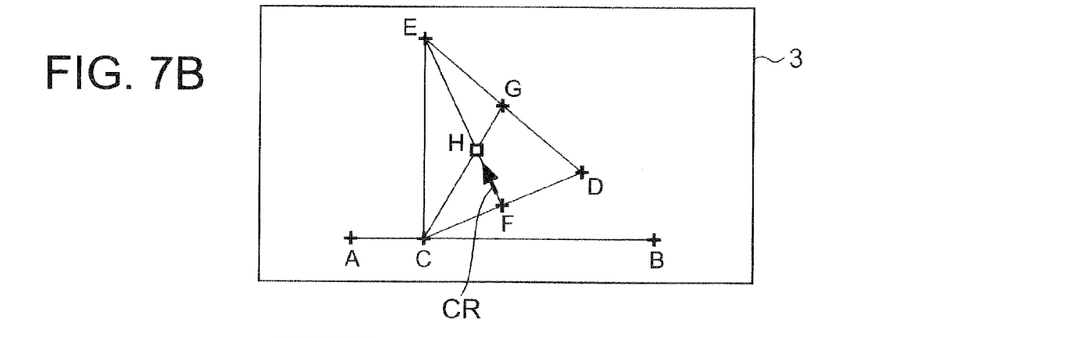

Next, as shown in FIG. 7B, the user moves the cursor CR onto the point H by operating the direction key 24, and operates the EXE key 22, the OPTN key 26, and the "7" key in the numeric keys 20, in this order (Step S4; Yes). Consequently, the point H is set as a locus point (Step S5).

Figure 7C:
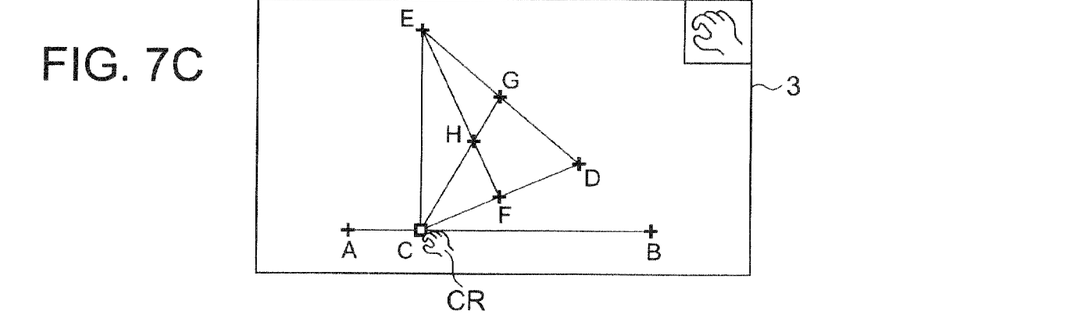

Next, as shown in FIG. 7C, the user operates the F2 key 25a and the "3" key in the numeric keys 20 to release all selections with the cursor CR. After that, the user operates the direction key 24 to move the cursor CR onto the point C, and operates the EXE key 22 (Step S6; Yes). Then, the point C is set as a moving point (Step S7). Incidentally, in the present operation example, the position of the point C at this time is a movement starting position of the moving point C.

Next, the user operates the direction key 24 to move the cursor CR on the line segment AB. After that, when the user operates the EXE key 22 (Step S6; Yes), the position of the cursor CR at the time of the operation is set as the movement ending position of the moving point C, and as the result, the moving range of the moving point C is set (Step S7).

Figure 7D:
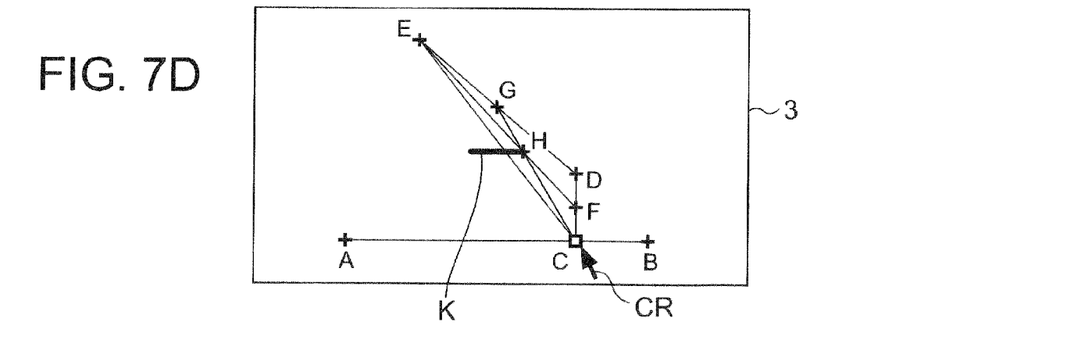

Next, when the user operates the various key group 2 to perform the movement instructing operation of the moving point C (Step S8; Yes), as shown in FIGS. 7C and 7D, the moving point C and the locus point H move, and the locus of the locus point H is rendered as a thick line K (Step S11).

Next, the coordinates of the movement starting position of the moving point C are set as $(xC1, yC1)$, and the coordinates of the movement ending position of the moving point C are set as $(xC10, yC10)$. After that, the moving path of the moving point C between the movement starting position and the movement ending position are divided into equal parts, and the coordinates of the division points $(xC1, yC1)$, $(xC2, yC2)$, . . . $(xC9, yC9)$, and $(xC10, yC10)$ are calculated. Furthermore, the coordinates of the locus point H at the time when the moving point C is situated at each of the division points $(xH1, yH1)$, $(xH2, yH2)$, . . . $(xH9, yH9)$, and $(xH10, yH10)$ are calculated (Step S12).

Figure 8A:
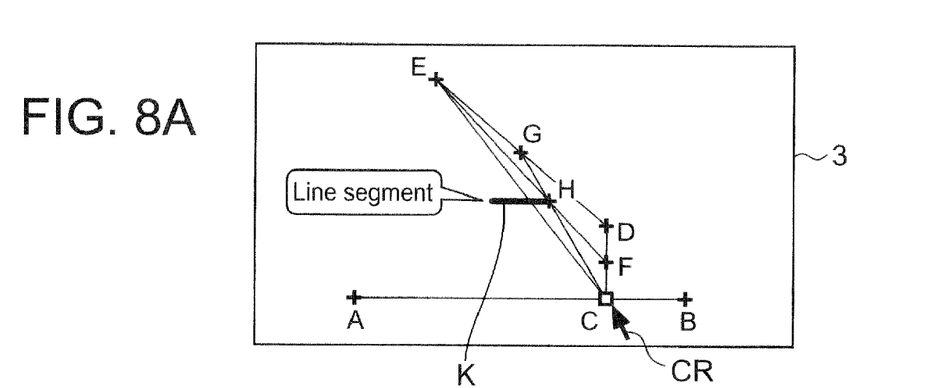
FIGS. 8A and 8B are other diagrams showing display contents in the figure rendering processing.

Next, as shown in FIG. 8A, the user operates the OPTN key 26 and the "8" key in the numeric keys 20 to perform a locus analyzing operation (Step S14; Yes). Each of the coordinates of the locus point H $(xH1, yH1)$, $(xH2, yH2)$, . . . $(xH9, yH9)$, and $(xH10, yH10)$ is judged to satisfy the functional formula $y=ax+b$ of the straight line (Step T3; Yes), and the kind of locus "straight line" is displayed on the display 3 (Step T10).

Figure 8B:
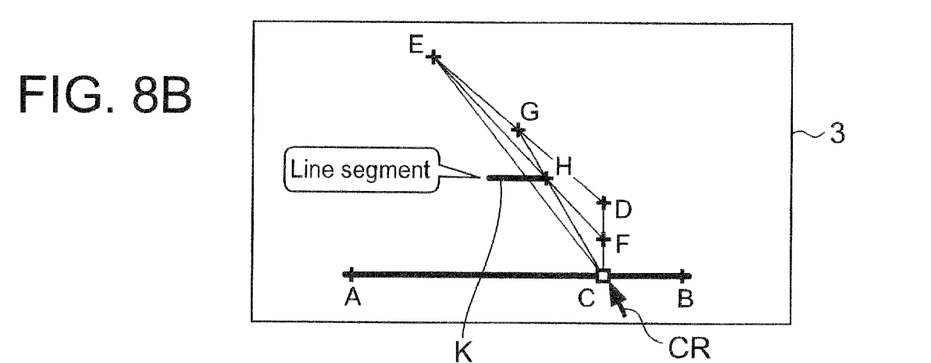

Then, as shown in FIG. 8B, the user operates the OPTN key 26 and the "8" key in the numeric keys 20 to perform the locus analyzing operation (Step S16; Yes). Then, it is judged that the parallel straight line AB to the locus straight line (thick line K) exists in the rendering figure (Step T12; Yes), and the identification display of the parallel straight line AB is performed to be thick (Step T13).

According to the scientific calculator 1 described above, as shown in Step S12 in FIG. 4, Steps T1-T10 in FIG. 5, and FIG. 8A, the locus of a locus point when a moving point moves in a moving range is rendered, and a plurality of pieces of the position information of the locus point in the locus is obtained. Then, it is judged whether the position information fit each of the functional formulae of a straight line, a circle, and a conic curve or not. The information of the functional formula that is judged to be fit by the position information is displayed. Consequently, the content of the locus can be recognized by a user by the information of the functional formula.

Moreover, as shown by Step S12 in FIG. 4 and by FIG. 8A, a plurality of pieces of position information of a moving point when the moving point moves in a moving range is calculated, and the position information of a locus point is calculated on the basis of each piece of calculated position information of the moving point. Consequently, the exact content of the locus can be recognized by a user.

Moreover, as shown by Steps T11-T19 in FIG. 6 and by FIG. 8B, if a plurality of pieces of position information obtained about a locus point is judged to fit the functional formula of a straight line, then a parallel straight line to the locus straight line is retrieved from the rendering figure. If a plurality of pieces of position information is judged to fit the functional formula of a circle, then a central point of the locus circle is retrieved from the rendering figure. If a plurality of pieces of position information is judged to fit the functional formula of a conic curve other than a circle, then a focus of the conic curve is retrieved from the rendering figure. The identification display of the retrieved straight line, central point, and focus is performed, and consequently the understanding of the content of a locus can be made to be easier.

Incidentally, the present invention is not limited to the embodiment described above, and various improvements and changes of the design thereof may be performed without departing from the scope and spirit of the present invention.

For example, although the CPU 8 has been described to display a kind of locus in the aforesaid embodiment, the CPU 8 may display the function formula of a locus.

Moreover, although the CPU 8 has been described to perform the locus analyzing processing (1) and (2) on the basis of user's operations after the rendering of a locus, the locus analyzing processing (1) and (2) may be adapted to be automatically performed after the rendering of a locus.

Moreover, although the identification display of a parallel line, a central point, a focus, or the like, corresponding to the figure of a locus has been described to be performed if the parallel line or the like exists, the identification display may be performed by automatically rendering the parallel line or the like if the parallel line or the like does not exists.

The entire disclosure of Japanese Patent Application No. 2007-238912 filed on Sep. 14, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A figure rendering-apparatus comprising:
a figure displaying section to display a figure by rendering the figure on a display screen;
a moving point setting section to set an arbitrary point on a rendering figure as a moving point based on a user's operation;
a moving point moving range setting section to set a moving range of the moving point based on a user's operation;
a locus point setting section to set an arbitrary point on the rendering figure as a locus point based on a user's operation;
a moving point position information obtaining section to obtain a plurality of pieces of position information of the moving point when the moving point moves in the moving range;
a locus position information obtaining section to obtain a plurality of pieces of position information based on the plurality of pieces of position information of the moving point obtained by the moving point position information obtaining section; and
a locus information display control section to display information of one of predetermined functional formulae on the display screen when the plurality of pieces of position information obtained by the locus position information obtaining section fit one of the predetermined functional formulae, and to display information indicating that the plurality of pieces of position information do not fit any of the predetermined functional formulae, on the display screen, when the plurality of pieces of position information do not fit any of the predetermined functional formulae.

2. The figure rendering apparatus of claim 1, wherein:
the figure displaying section includes a figure element rendering section to render at least one of figure elements including a point, a straight line, and a curved line;
the moving point setting section includes a fixed figure element specifying section to specify an arbitrary figure element among the figure elements to be rendered by the figure element rendering section as a fixed figure element based on a user's operation; and
the moving point position information obtaining section obtains the plurality of pieces of position information of the moving point at a time when the moving point moves in the moving range with the fixed figure element being fixed.

3. The figure rendering apparatus of claim 2, further comprising a figure element identification display control section to perform identification display of the fixed figure element and the figure elements other than the fixed figure element among the figure elements rendered by the figure element rendering section.

4. The figure rendering apparatus of claim 1, further comprising:
a parallel straight line retrieving section to retrieve a parallel straight line that is parallel to a straight line of a locus of the locus point from the figure rendered by the figure displaying section when the plurality of pieces of position information obtained by the locus position information obtaining section are judged to fit a functional formula of the straight line;
a central point retrieving section to retrieve a central point of a circle of the locus from the figure rendered by the figure displaying section when the plurality of pieces of position information obtained by the locus position information obtaining section are judged to fit a functional formula of the circle;
a focus retrieving section to retrieve a focus of a conic curve of the locus from the figure rendered by the figure displaying section when the plurality of pieces of position information obtained by the locus position information obtaining section are judged to fit a functional formula of the conic curve other than that of the circle; and
a related figure element identification display control section to perform identification display of any of the straight line, the central point, and the focus that are retrieved by the parallel straight line retrieving section, the central point retrieving section, and the focus retrieving section, respectively, on the display screen.

5. The figure rendering apparatus of claim 2, further comprising:
- a parallel straight line retrieving section to retrieve a parallel straight line that is parallel to a straight line of a locus of the locus point from the figure rendered by the figure displaying section when the plurality of pieces of position information obtained by the locus position information obtaining section are judged to fit a functional formula of the straight line;
- a central point retrieving section to retrieve a central point of a circle of the locus from the figure rendered by the figure displaying section when the plurality of pieces of position information obtained by the locus position information obtaining section are judged to fit a functional formula of the circle;
- a focus retrieving section to retrieve a focus of a conic curve of the locus from the figure rendered by the figure displaying section when the plurality of pieces of position information obtained by the locus position information obtaining section are judged to fit a functional formula of the conic curve other than that of the circle; and
- a related figure element identification display control section to perform identification display of any of the straight line, the central point, and the focus that are retrieved by the parallel straight line retrieving section, the central point retrieving section, and the focus retrieving section, respectively, on the display screen.

6. The figure rendering apparatus of claim 3, further comprising:
- a parallel straight line retrieving section to retrieve a parallel straight line that is parallel to a straight line of a locus of the locus point from the figure rendered by the figure displaying section when the plurality of pieces of position information obtained by the locus position information obtaining section are judged to fit a functional formula of the straight line;
- a central point retrieving section to retrieve a central point of a circle of the locus from the figure rendered by the figure displaying section when the plurality of pieces of position information obtained by the locus position information obtaining section are judged to fit a functional formula of the circle;
- a focus retrieving section to retrieve a focus of a conic curve of the locus from the figure rendered by the figure displaying section when the plurality of pieces of position information obtained by the locus position information obtaining section are judged to fit a functional formula of the conic curve other than that of the circle; and
- a related figure element identification display control section to perform identification display of any of the straight line, the central point, and the focus that are retrieved by the parallel straight line retrieving section, the central point retrieving section, and the focus retrieving section, respectively, on the display screen.

7. A non-transitory computer-readable storage medium having a figure rendering program stored thereon for causing a computer having a display screen and a storage section to perform functions comprising:
- a figure displaying function for displaying a figure by rendering the figure on a display screen;
- a moving point setting function for setting an arbitrary point on a rendering figure as a moving point and storing the moving point into the storage section based on a user's operation;
- a moving point moving range setting function for setting a moving range of the moving point and storing the moving range into the storage section based on a user's operation;
- a locus point setting function for setting an arbitrary point on the rendering figure as a locus point based on a user's operation;
- a moving point position information obtaining function for obtaining a plurality of pieces of position information of the moving point when the moving point moves in the moving range;
- a locus position information obtaining function for obtaining a plurality of pieces of position information based on the plurality of pieces of position information of the moving point obtained by the moving point position information obtaining function; and
- a locus information display control function for displaying information of one of predetermined functional formulae on the display screen when the plurality of pieces of position information obtained by the locus position information obtaining function fit one of the predetermined functional formulae, and displaying information indicating that the plurality of pieces of position information do not fit any of the predetermined functional formulae, on the display screen, when the plurality of pieces of position information do not fit any of the predetermined functional formulae.

8. The computer-readable storage medium of claim 7, wherein:
- the figure displaying function includes a figure element rendering function to render at least one of figure elements including a point, a straight line, and a curved line;
- the moving point setting function includes a fixed figure element specifying function to specify an arbitrary figure element among the figure elements to be rendered by the figure element rendering function as a fixed figure element based on a user's operation; and
- the moving point position information obtaining function obtains the plurality of pieces of position information of the moving point at a time when the moving point moves in the moving range with the fixed figure element being fixed.

9. The computer-readable storage medium of claim 8, wherein the functions further comprise a figure element identification display control function to perform identification display of the fixed figure element and the figure elements other than the fixed figure element among the figure elements rendered by the figure element rendering function.

10. The computer-readable storage medium of claim 7, wherein the functions further comprise:
- a parallel straight line retrieving function to retrieve a parallel straight line that is parallel to a straight line of a locus of the locus point from the figure rendered by the figure displaying function when the plurality of pieces of position information obtained by the locus position information obtaining function are judged to fit a functional formula of the straight line;
- a central point retrieving function to retrieve a central point of a circle of the locus from the figure rendered by the figure displaying function when the plurality of pieces of position information obtained by the locus position information obtaining function are judged to fit a functional formula of the circle;
- a focus retrieving function to retrieve a focus of a conic curve of the locus from the figure rendered by the figure displaying function when the plurality of pieces of position information obtained by the locus position information obtaining function are judged to fit a functional formula of the conic curve other than that of the circle; and a related figure element identification display control function to perform identification display of any of the straight line, the central point, and the focus that are retrieved by the parallel straight line retrieving function, the central point retrieving function, and the focus retrieving function, respectively, on the display screen.

11. The computer-readable storage medium of claim 8, wherein the functions further comprise:

a parallel straight line retrieving function to retrieve a parallel straight line that is parallel to a straight line of a locus of the locus point from the figure rendered by the figure displaying function when the plurality of pieces of position information obtained by the locus position information obtaining function are judged to fit a functional formula of the straight line;

a central point retrieving function to retrieve a central point of a circle of the locus from the figure rendered by the figure displaying function when the plurality of pieces of position information obtained by the locus position information obtaining function are judged to fit a functional formula of the circle;

a focus retrieving function to retrieve a focus of a conic curve of the locus from the figure rendered by the figure displaying function when the plurality of pieces of position information obtained by the locus position information obtaining function are judged to fit a functional formula of the conic curve other than that of the circle; and a related figure element identification display control function to perform identification display of any of the straight line, the central point, and the focus that are retrieved by the parallel straight line retrieving function, the central point retrieving function, and the focus retrieving function, respectively, on the display screen.

12. The computer-readable storage medium of claim 9, wherein the functions further comprise:

a parallel straight line retrieving function to retrieve a parallel straight line that is parallel to a straight line of a locus of the locus point from the figure rendered by the figure displaying function when the plurality of pieces of position information obtained by the locus position information obtaining function are judged to fit a functional formula of the straight line;

a central point retrieving function to retrieve a central point of a circle of the locus from the figure rendered by the figure displaying function when the plurality of pieces of position information obtained by the locus position information obtaining function are judged to fit a functional formula of the circle;

a focus retrieving function to retrieve a focus of a conic curve of the locus from the figure rendered by the figure displaying function when the plurality of pieces of position information obtained by the locus position information obtaining function are judged to fit a functional formula of the conic curve other than that of the circle; and a related figure element identification display control function to perform identification display of any of the straight line, the central point, and the focus that are retrieved by the parallel straight line retrieving function, the central point retrieving function, and the focus retrieving function, respectively, on the display screen.

* * * * *